US012786019B2

(12) United States Patent
Molina et al.

(10) Patent No.: US 12,786,019 B2
(45) Date of Patent: Nov. 3, 2026

(54) APPARATUS FOR CONTROLLING AN EQUALIZER, SIGNAL PROCESSING SYSTEM, RECEIVER, BASE STATION, MOBILE DEVICE, METHOD FOR CONTROLLING AN EQUALIZER

(71) Applicant: Intel Corporation, Santa Clara, CA (US)

(72) Inventors: Albert Molina, Novelda (ES); Wayne Ballantyne, Chandler, AZ (US); Kannan Rajamani, Basking Ridge, NJ (US); Benjamin Jann, Portland, OR (US); Zoran Zivkovic, Hertogenbosch (NL); Kameran Azadet, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/145,874

(22) Filed: Dec. 23, 2022

(65) Prior Publication Data

US 2024/0214248 A1 Jun. 27, 2024

(51) Int. Cl.
*H04L 25/03* (2006.01)

(52) U.S. Cl.
CPC .... *H04L 25/03949* (2013.01); *H04L 25/0391* (2013.01); *H04L 25/03961* (2013.01)

(58) Field of Classification Search
CPC ........... H04L 25/03949; H04L 25/0391; H04L 25/03961
USPC .......................................................... 375/262
See application file for complete search history.

(56) References Cited

U.S. PATENT DOCUMENTS 4,242,650 A * 12/1980 Cordell .................. H04B 3/145
327/306

FOREIGN PATENT DOCUMENTS

WO WO-9724858 A2 * 7/1997 ............... H03G 5/22

* cited by examiner

*Primary Examiner* — Dominic D Saltarelli
(74) *Attorney, Agent, or Firm* — SPL Patent Attorneys PartG mbB; Yong Beom Hwang

(57) ABSTRACT

An apparatus for controlling an equalizer is provided. The apparatus comprises interface circuitry configured to receive at least one of an input signal and an output signal of the equalizer. The apparatus further comprises processing circuitry configured to determine at least one signal metric based on the at least one of the input signal and the output signal of the equalizer, select an operating mode of the equalizer from a plurality of different operating modes based on the determined signal metric, and control the equalizer to operate in the selected operating mode.

20 Claims, 10 Drawing Sheets

APPARATUS FOR CONTROLLING AN EQUALIZER, SIGNAL PROCESSING SYSTEM, RECEIVER, BASE STATION, MOBILE DEVICE, METHOD FOR CONTROLLING AN EQUALIZER

BACKGROUND

In signal processing, an equalizer can be used to postprocess, especially equalize, a signal provided by signal processing circuitry. Such equalizer, however, may be dimensioned to handle, especially equalize, a most demanding signal, resulting in over dimensioning for less demanding signals and excessive power consumption, latency, or the like.

Hence, there may be a demand for improved equalizing in nonlinear signal processing.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
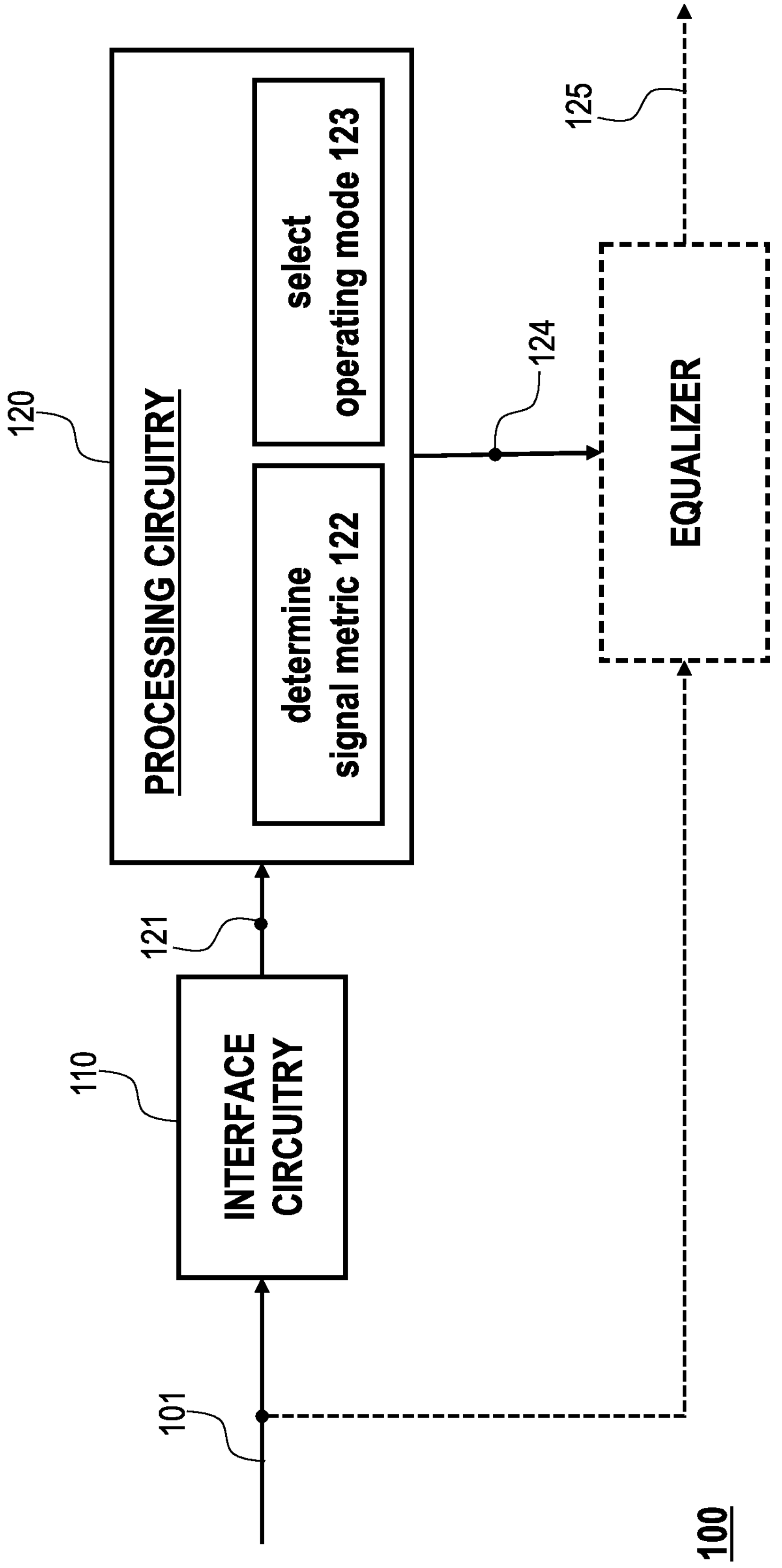
FIG. 1 illustrates a first example of an apparatus for controlling an equalizer.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 schematically illustrates an exemplary apparatus 100 for controlling an equalizer utilized in signal processing. The apparatus 100 comprises interface circuitry 110 configured to receive an input signal 101 that is provided by e.g. signal processing circuitry (not shown in FIG. 1, but see e.g. FIG. 5 or FIG. 6) arranged upstream to the apparatus 100. In at least some examples, the interface circuitry 110 may also be referred to as an input node that is operatively coupled to the signal processing circuitry for receiving the input signal 101 therefrom. Further, the apparatus 100 comprises processing circuitry 120 operatively coupled to the interface circuitry 110. For example, an input node 121 of the processing circuitry 120 may be coupled to the interface circuitry 110 to receive the input signal 101. The processing circuitry 120 is configured to determine at least one signal metric 122 based on the received input signal 101. Further, the processing circuitry 120 is configured to select, based on the determined signal metric 122, an operating mode 123 of the equalizer from a plurality of different operating modes based on the determined signal metric 122. In addition, the processing circuitry 120 is configured to control the equalizer to operate in the selected operating mode 123. For example, the processing circuitry 120 may be configured to generate corresponding control data or one or more control signals to be output to the equalizer. The control data or control signal may comprise information about and/or an indicator for the selected operating mode that is to be used for operation of the equalizer. For this, the processing circuitry 120 may be operatively coupled to the equalizer, e.g., via an output node 124 of the processing circuitry 120. It is noted that although FIG. 1 illustrates a direct coupling of the processing circuitry 120 to the equalizer, this coupling may also be indirect via, for example, an optional control circuitry or the like.

As used herein, the input signal 101 may be any signal having undesirable characteristics, conditions, behavior, or the like. For example, the input signal 101, as an actual signal provided by the signal processing circuitry, may deviate from a desired signal, e.g., an ideal signal, in some way. For instance, the input signal 101 may include one or more of mismatches, nonlinearities, or the like, caused by the upstream signal processing circuitry. Accordingly, the nonlinear signal processing circuitry may be any circuitry that causes, due to any signal influencing property thereof and/or inherently, e.g., inherent to its design, the input signal 101 to deviate in some way from the desired signal, which in some examples may also be an ideal signal. By way of example, such nonlinear signal processing circuitry may comprise one or more of a buffer, a sampler, or the like, which may suffer from a nonlinearity causing the input signal 101 to show intermodulation, harmonic distortion, or other undesirable characteristics. Further, for instance, this non-linear behavior may only be seen if an input signal of the upstream signal processing circuitry is above a certain threshold. Also, direct current (DC) offset, frequency response mismatch, or the like, may limit performance of such nonlinear signal processing circuitry. In at least some examples, the input signal 101 may be an output signal of an analog-to digital converter (ADC), a time-interleaved ADC, or the like, wherein this is not limited herein, and the equalizer may be configured to equalize various types of signals provided by various types of signal processing circuitries.

The equalizer, in general, may be configured to receive the input signal 101 provided by the upstream signal processing circuitry, to equalize the input signal 101 and to generate a corresponding, equalized output signal 125. In other words, the equalizer may be configured to at least partially compensate for the deviation of the input signal 101 from the desired signal, such as an ideal signal. For example, the equalizer may be configured to at least partially compensate for one or more of the above-mentioned mismatches, nonlinearities, intermodulation, etc., of the input signal 101. Thereby, the equalizer may be controlled to operate in accordance with the operating mode 123 selected by the apparatus 100, particularly by its processing circuitry 120. Merely by way of example, the equalizer (see e.g. equalizer 1200 illustrated in FIG. 5 or equalizer 2200 illustrated in FIG. 6) may be a time-variant non-linear equalizer (NLEQ), wherein this is not limited herein, since other types of equalizers are also conceivable depending on a specific application scenario.

The plurality of operating modes of the equalizer, from which the apparatus 100, and particularly its processing circuitry 120, may select, may differ from each other in several aspects. For example, the plurality of operating modes of the equalizer may differ from each other by at least one of functions, e.g., basis functions, of the equalizer enabled or disabled for equalization of the input signal 101 by the equalizer, a power consumption of the equalizer and a latency of the equalizer. The equalizer may be configured to utilize a number of basis functions for equalization of the input signal 101. For instance, this number of functions may include one or more of linear and/or non-linear functions, e.g., linear and/or nonlinear basis functions. In this regard, the number of functions utilized in each operating mode may affect the power consumption and/or latency of the equalizer, wherein a smaller number of functions utilized, i.e., enabled, may result in reduced power consumption and/or latency and a larger number of functions utilized, i.e., enabled, may result in increased power consumption and/or latency. At the same time, the number of functions utilized may affect the degree and/or performance of equalization of the input signal 101. Accordingly, a larger number of functions utilized, i.e., enabled, for equalization of the input signal 101 may result in a more accurate equalization of the input signal 101, allowing the input signal 101 to be more accurately matched or adjusted to the desired signal. In other words, enabling the overall set of basis functions, i.e., enabling all of the basis functions, may result in overall higher performance of equalization of the input signal 101, while a reduced set of basis functions, utilized, i.e., enabled, may result in a comparatively lower performance of equalization of the input signal 101, but at the same time also in a lower power consumption and/or a lower latency of the equalizer. In general, power consumption and/or latency of the equalizer is dependent on the number of basis functions utilized for equalization of the input signal 101. In some signal environments, the higher equalization performance is not required due to lower power input signals being present; thus lower power consumption can be realized by using fewer basis functions without significantly impacting overall system performance.

Accordingly, the processing circuitry 120 may be configured to enable or disable one or more of the basis functions of the equalizer in accordance with the selected operating mode.

For example, in a first operating mode, which may also be referred to as a normal operating mode of the equalizer, a first number of basis functions of the equalizer may be enabled for equalization of the input signal 101. The first number of basis functions enabled in the first operating mode may be an overall set of basis functions. In other words, in the first operating mode, the equalizer may utilize the first number of basis functions.

In a second operating mode, which may be one of several operating modes additional to the first operating mode, a second number of basis functions may be enabled for equalization of the input signal 101, wherein the second number of enabled basis functions is smaller than the first number of enabled basis functions. In other words, the second operating mode may utilize a reduced set of basis functions compared to the first operating mode.

In a third operating mode, a further part of the basis functions of the equalizer may be disabled or a further reduced set of basis functions may be enabled compared to the second operating mode.

Further, by way of example, the second and third operating mode, or any further, n-th operating mode, may be referred to as a respective low power operating mode compared to the first operating mode, i.e., the normal operating mode, since, as described above, disabling one or more basis functions of the equalizer may cause the equalizer to have a lower power consumption and/or latency. Accordingly, the second operating mode may cause a lower power consumption of the equalizer than the first operating mode. Likewise, the third operating mode may cause a lower power consumption of the equalizer than in the second operating mode and in the first operating mode, and so forth. It is noted that the number of operating modes is not limited herein, and the equalizer may be operable in more than three operating modes, i.e., may be operable in n-th operating modes, wherein $n>3$, which differ from each other in the number of basis functions utilized, i.e., enabled, for equalization of the input signal 101.

In at least some examples, in the second operating mode, some or all of the nonlinear basis functions may be disabled, and in the third operation mode, some or all of the nonlinear basis functions and some or all of the linear basis functions of the equalizer may be disabled, wherein in each of the second, third and n-th operating mode, more of those functions may be disabled than in the $n-1$-th operating mode.

Further, it is noted that the processing circuitry 120 may be configured to dynamically determine the at least one signal metric of the input signal 101 and select the operating mode, accordingly, compared to statically removing functions, especially basis functions, from the equalizer. In other words, the processing circuitry 120 may be configured to dynamically adjust the operating mode of the equalizer based on the at least one signal metric.

In at least some examples, the processing circuitry 120 may be configured to cause selection of the operating mode of the equalizer based on comparing the at least one signal metric 122 to at least one corresponding threshold. For example, the processing circuitry 120 may hold, e.g., store, one or more thresholds that may be used successively or simultaneously to compare the at least one signal metric therewith.

The at least one signal metric may be any indicator and/or any suitable measure, characteristic, condition, or the like, of the input signal 101, on the basis of which the number of basis functions of the equalizer to be enabled or disabled can be determined. In at least some examples, the at least one signal metric may indicate a signal size of the input signal 101. In other words, the criterion based on which the processing circuitry 120 selects the operating mode of the equalizer may be the signal size of the input signal 101. For example, a larger signal size of the input signal 101 may indicate a larger number of basis functions of the equalizer to be enabled, and a smaller signal size of the input signal 101 may indicate a smaller number of basis functions of the equalizer to be enabled. In other words, the processing circuitry 120 may be configured to select the operating mode of the equalizer based on the signal size of the input signal 101. Thereby, the processing circuitry 120 may be configured to select the above-mentioned second, third or n-th operating mode if the signal size of the input signal 101 indicates that the input signal 101 may be still equalized in a sufficient manner by one or more of those second, third or n-th operating modes of the equalizer. This allows for reducing the power consumption and/or latency of the equalizer in cases where the signal size of the input signal 101 does not require equalization by means of the first operating mode, by selecting the respective one of the second, third or n-th operating mode of the equalizer.

In at least some examples, the processing circuitry 120 may be configured to apply at least one measurement metric to the input signal of the equalizer to obtain the at least one signal metric. For instance, the at least one measurement metric may be configured for estimation of one or more of an average power, an average absolute value, a peak power, a histogram count, an incidence rate of signal overload events, a reduction of average uplink Modulation and Coding format, or the like, of the input signal 101.

In at least some examples, the processing circuitry 120 may be configured to utilize a finite state machine (FSM) for selecting the operating mode 123 from the plurality of operating modes. Thereby, each operating mode may correspond to a respective state of the FSM. For example, the processing circuitry 120 may be configured to cause a transition from one operating mode or state of the FSM to another operating mode or state of the FSM based on comparing the at least one signal metric to at least one corresponding threshold.

Figure 2:
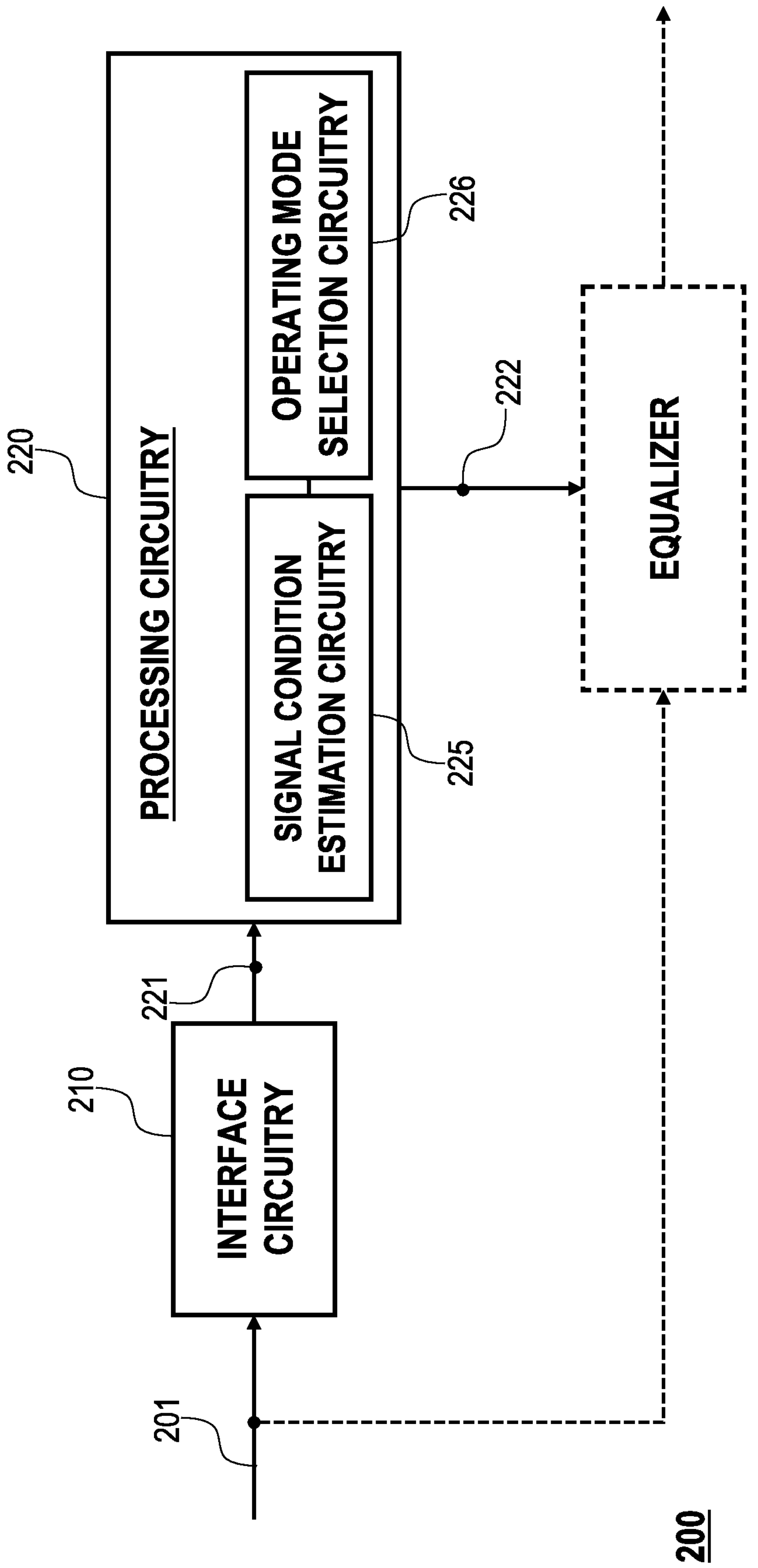
FIG. 2 illustrates a second example of an apparatus for controlling an equalizer.

FIG. 2 schematically illustrates another exemplary apparatus 200 for controlling an equalizer utilized in signal processing. As in the foregoing example, the apparatus 200 comprises interface circuitry 210 configured to receive an input signal 201 and processing circuitry 220 coupled to the interface circuitry 210 via an input node 221 of the processing circuitry 220 and configured to equalize the input signal 201. Further, as in the foregoing example, the processing circuitry 220 is configured to determine at least one signal metric based on the input signal 201 and to select an operating mode of the equalizer from a plurality of different operating modes based on the determined signal metric. Further, as in the foregoing example, the processing circuitry 220 may comprise an output node 222 configured to output the selected operating mode to the equalizer to control operation of the equalizer, accordingly. For example, the processing circuitry 220 may be configured to generate corresponding control data or one or more control signals to be output to the equalizer. The control data or control signal may comprise information about and/or an indicator for the selected operating mode that is to be used for operation of the equalizer. It is noted that the above description of the apparatus and the equalizer with reference to FIG. 1 also applies to the apparatus 200 and the equalizer according to FIG. 2, unless otherwise described herein. Accordingly, a repetition of the above description may be omitted here.

FIG. 2 further illustrates an example of how the at least one signal metric 222 described above may be determined. For this purpose, the apparatus 200 may comprise signal condition estimation circuitry 225 configured to obtain the at least one signal metric 222, wherein the signal estimation circuitry 225 comprises a number of filters each of which has a different bandwidth and into which the input signal 201 of the equalizer is fed. In at least some examples, the input signal 201 may be squared before or when feeding it into the number of filters, resulting in that the at least one signal metric 222 relates to input power. However, it is noted that at least one signal metric 222 is not limited to input power but may be any other metric, such as an absolute value or the like. Thereby, the signal estimation circuitry 225 may be configured to cause selection of the operating mode from the plurality of operating modes based on an output of the number of filters. It is noted that the signal condition estimation circuitry 225 is not necessarily part of the processing circuitry 220 as exemplary illustrated in FIG. 2 but may be provided separate thereto.

According to the example illustrated in FIG. 2, the apparatus 200 may further comprise operating mode selection circuitry 226 configured to select the operating mode 223 as described above. The operating mode selection circuitry 226 may be operatively coupled to the signal condition estimation circuitry 225. The operating mode selection circuitry 226 may be further configured to output the selected operating mode of the equalizer to the equalizer, e.g., via the output node 222 of the processing circuitry 220, to which it is operatively coupled. It is noted that the operating mode selection circuitry 226 is not necessarily part of the processing circuitry 220 as exemplary illustrated in FIG. 2 but may be provided separate thereto.

Figure 3:
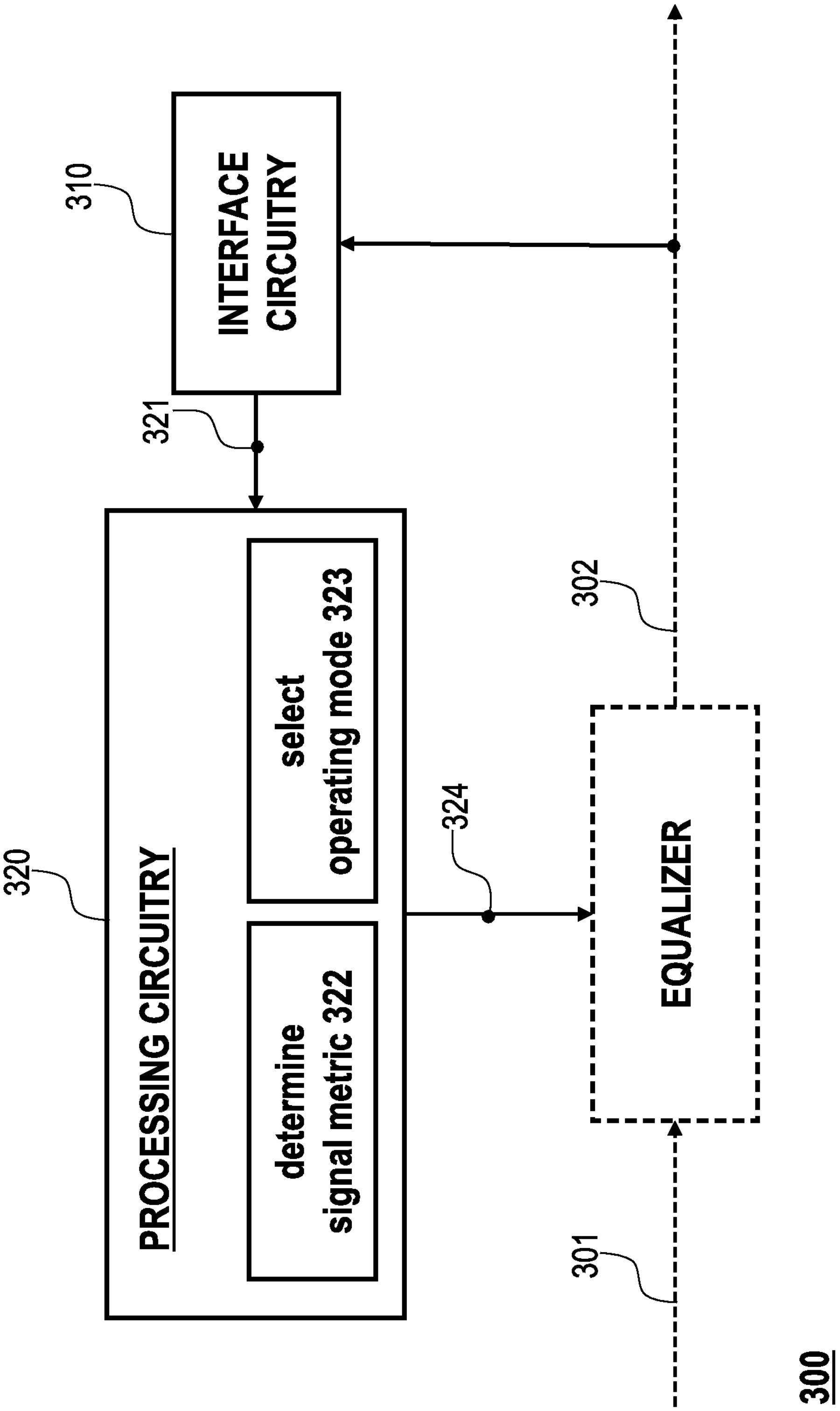
FIG. 3 illustrates a third example of an apparatus for controlling an equalizer.

FIG. 3 schematically illustrates another exemplary apparatus 300 for controlling an equalizer utilized in signal processing. As in the above examples, the apparatus 300 comprises interface circuitry 310 and processing circuitry 320 coupled to the interface circuitry 310 via an input node 321 of the processing circuitry 320. It is noted that the apparatus 300 according to FIG. 3 differs from the above examples basically in its signal flow, since, here, an input signal 301 of an upstream signal processing circuitry is first fed into the equalizer, which, in turn, is configured to equalize the input signal 301 and to generate a corresponding, equalized output signal 302. That is, deviating from the above examples, in the apparatus according to FIG. 3, the interface circuitry 310 is configured to receive the output signal 302 of the equalizer instead of directly receiving the input signal 301 from the nonlinear signal processing circuitry. However, as in the above examples, the processing circuitry 320 is still configured to determine at least one signal metric 322 based on the output signal 302 of the equalizer and to select an operating mode 323 of the equalizer from a plurality of different operating modes based on the determined signal metric 322. It is noted that the above description of the apparatus and the equalizer with reference to FIGS. 1 and 2 also applies to the apparatus 300 and the equalizer according to FIG. 3, unless otherwise described herein. Accordingly, a repetition of the above description may be omitted here.

Figure 4:
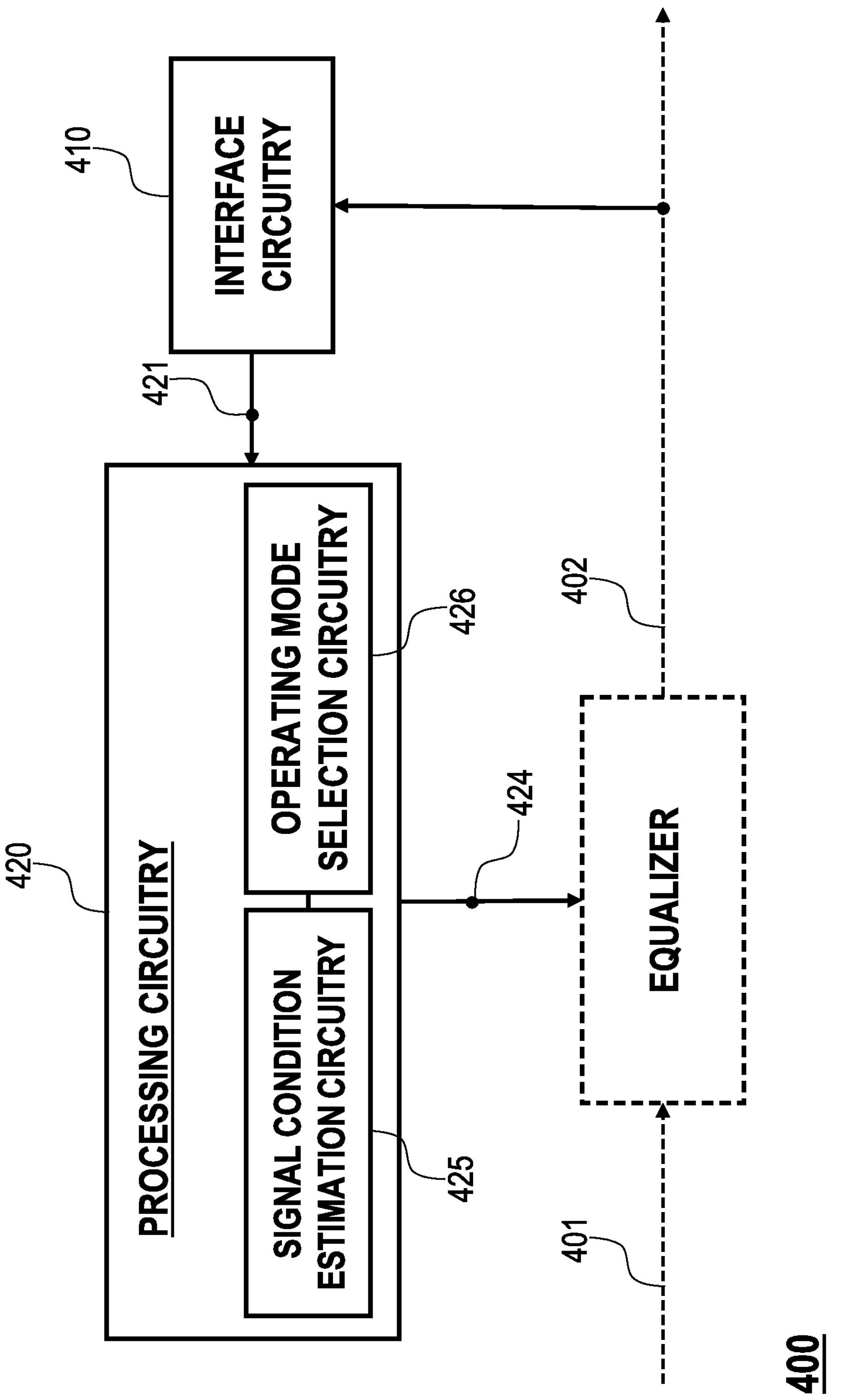
FIG. 4 illustrates a fourth example of an apparatus for controlling an equalizer.

FIG. 4 schematically illustrates another exemplary apparatus 400 for controlling an equalizer utilized in signal processing. As in the foregoing example, the apparatus 400 comprises interface circuitry 410 and processing circuitry 420 coupled to the interface circuitry 310 via an input node 421 of the processing circuitry 320. As described above with reference to FIG. 3, an input signal 401 of a nonlinear signal processing circuitry is fed into the equalizer, which, in turn, is configured to equalize the input signal 401 and to generate a corresponding, equalized output signal 402. Thereby, the interface circuitry 410 is configured to receive the output signal 402 of the equalizer. Further, the processing circuitry 420 is configured to determine at least one signal metric 422 based on the output signal 402 of the equalizer and to select an operating mode 423 of the equalizer from a plurality of different operating modes based on the determined signal metric 422. It is noted that the above description of the apparatus and the equalizer with reference to FIG. 3 (and likewise of FIGS. 1 and 2) also applies to the apparatus 400 and the equalizer according to FIG. 4, unless otherwise described herein. Accordingly, a repetition of the above description may be omitted here.

FIG. 4 further illustrates an example of how the at least one signal metric 422 described above may be determined. For this purpose, the apparatus 400, at least similar to the apparatus illustrated in FIG. 2, may comprise signal condition estimation circuitry 425 configured to obtain the at least one signal metric, wherein the signal estimation circuitry 425 comprises a number of filters each of which has a different bandwidth and into which the input signal 401 of the equalizer is fed. In at least some examples, the input signal 201 may be squared before or when feeding it into the number of filters, resulting in that the at least one signal metric 222 relates to input power. However, it is noted that at least one signal metric is not limited to input power but may be any other metric, such as an absolute value or the like. Thereby, an output of the signal estimation circuitry 425 may be used to cause selection of the operating mode from the plurality of operating modes based on an output of the number of filters. It is noted that the signal condition estimation circuitry 425 is not necessarily part of the processing circuitry 420 as exemplary illustrated in FIG. 4 but may be provided separate thereto.

According to the example illustrated in FIG. 4, the apparatus 400, at least similar to the apparatus illustrated in FIG. 2, may further comprise operating mode selection circuitry 426 configured to select the operating mode 423 as described above. The operating mode selection circuitry 426 may be operatively coupled to the signal condition estimation circuitry 425. The operating mode selection circuitry 426 may be further configured to output the selected operating mode of the equalizer to the equalizer, e.g., via the output node 424 of the processing circuitry 420, to which it is operatively coupled. It is noted that the operating mode selection circuitry 426 is not necessarily part of the processing circuitry 420 as exemplary illustrated in FIG. 4 but may be provided separate thereto.

With respect to the examples illustrated in FIGS. 1 to 4, it is noted that the apparatus according to those examples may be configured to receive both the input signal and the output signal of the equalizer, at the interface circuitry, and to determine, by the processing circuitry, the at least one signal metric based on both the input signal and the output signal of the equalizer.

Also in this case, the processing circuitry may be configured to select the operating mode of the equalizer from the plurality of different operating modes based on the determined signal metric and to control the equalizer to operate in the selected operating mode.

Figure 5:
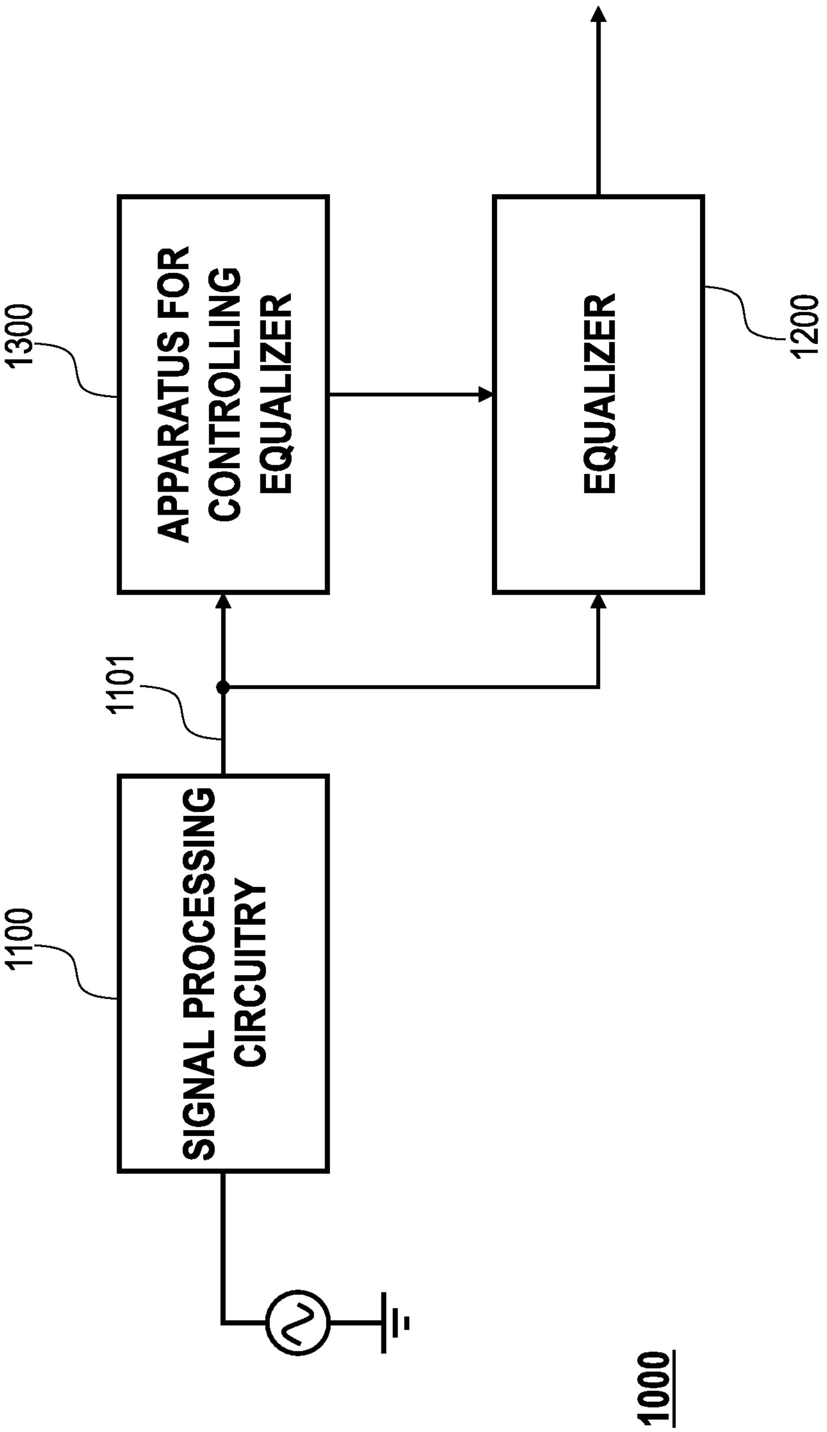
FIG. 5 illustrates a first example of a signal processing system comprising an apparatus for controlling an equalizer.

FIG. 5 schematically illustrates an exemplary signal processing system 1000. The signal processing system 1000 comprises nonlinear signal processing circuitry 1100 and an equalizer 1200 operatively coupled to the nonlinear signal processing circuitry 1100. As described above, the equalizer 1200 is configured to equalize an input signal 1101, wherein the input signal 1101 is based on an output of the nonlinear signal processing circuitry 1100. In addition, the signal processing system 1000 comprises an apparatus 1300 for controlling the equalizer 1200, as described above.

Thereby, the apparatus 1300 for controlling the equalizer 1200 may, for example, be configured in accordance with any of the examples described above with reference to any one of FIGS. 1 and 2. Accordingly, the apparatus 1300 may comprise interface circuitry configured to receive the input signal 1101 and processing circuitry coupled to the interface circuitry via an input node of the processing circuitry and configured to equalize the input signal 1101. Further, as in the examples described above with reference to any one of FIGS. 1 and 2, the processing circuitry may be configured to determine at least one signal metric based on the input signal 1101 and to select an operating mode of the equalizer 1200 from a plurality of different operating modes based on the determined signal metric. Further, the processing circuitry may comprise an output node configured to output the selected operating mode to the equalizer 1200 to control operation of the equalizer 1200, accordingly. It is noted that the above description of the apparatus with reference to FIG. 1 and/or FIG. 2 also applies to the apparatus 1300 according to FIG. 5 unless otherwise described herein. Accordingly, a repetition of the above description may be omitted here.

The nonlinear signal processing circuitry 1100 is configured to provide the input signal 1101 to the equalizer 1200. For pedagogical reasons only, an oscillator is illustrated in FIG. 5 as a signal source providing an analog input signal to the nonlinear signal processing circuitry 1100. As described above, the nonlinear signal processing circuitry 1100 may be any circuitry that causes, due to any signal influencing property thereof and/or inherently, e.g., inherent to its design, the input signal 1101 to deviate in some way from a desired signal, which in some examples may also be an ideal signal. By way of example, such nonlinear signal processing circuitry 1100 may comprise one or more of a buffer, a sampler, or the like, which may suffer from a nonlinearity causing the input signal 101 to show intermodulation, harmonic distortion, or other undesirable characteristics. In some examples, this non-linear behavior may only be seen if an input signal of the upstream signal processing circuitry is above a certain threshold. Also, DC offset, frequency response mismatch, or the like, may limit performance of such nonlinear signal processing circuit 1100.

In at least some examples, the nonlinear signal processing circuitry 1100 may form or may be part of an ADC, a time-interleaved analog-to-digital converter (TI-ADC), or the like, wherein this is not limited herein. For example, such TI-ADC may comprise a number of, e.g., lower speed, sub-ADCs operating in parallel to achieve a desired aggregate sampling rate of the overall TI-ADC. Such TI-ADC may suffer from DC offset and/or frequency response mismatch amongst the number of sub-ADCs, e.g., limiting spurious free dynamic range (SFDR). Due to the impairments of the nonlinear signal processing circuitry 1100 as described herein, the input signal 1101, which is output by the nonlinear signal processing circuitry 1100, may deviate from the desired signal, and the equalizer 1200 may be used to at least partially compensate for this deviation.

As described above, the equalizer 1200 may be configured to receive the input signal 1101 provided by the nonlinear signal processing circuitry 1100, to equalize the input signal 1101 and to generate a corresponding, equalized output signal. In other words, the equalizer 1200 may be configured to at least partially compensate for the deviation of the input signal 1101 from the desired signal, such as an ideal signal. For example, the equalizer 1200 may be configured to at least partially compensate for one or more of the above-mentioned mismatches, nonlinearities, intermodulation, etc., of the input signal 1101. Thereby, the equalizer may be dynamically controlled by the apparatus 1300 to operate in a plurality of different operating modes, which are associated with a corresponding equalization performance, power consumption and/or latency of the equalizer 1200. Further, as described above, the equalizer 1200 may be configured to utilize a number of basis functions for equalization of the input signal 1101. For instance, this number of basis functions may include one or more of linear and/or nonlinear functions, e.g., linear and/or nonlinear basis functions, depending on the selected operating mode of the equalizer.

Further, as described above, the equalizer 1200 may be configured to equalize various types of signals provided by various types of nonlinear signal processing circuitries. Merely by way of example, the equalizer 1200 is an NLEQ, wherein this is not limited herein, since other types of equalizers are also conceivable depending on a specific application scenario.

In at least some examples, the equalizer 1200 may be an NLEQ, and the nonlinear signal processing circuitry 1100 may be a TI-ADC. In such examples, the NLEQ may be implemented according to the following mathematical expression:

$$y_n = \sum_{i=0}^{N-1} h_i^{(n \% M)} f_i(x_n),$$

with N denoting a number of basis functions, M denoting the number of sub-ADCs, $f_i(x_n)$ denoting a basis function, i.e., a linear or a nonlinear function of the present and previous input samples, and $$h_i^{(p)}$$

denoting a coefficient associated with basis function $f_i(x_n)$ and sub-ADC p, for $p \in \{0 \ldots M-1\}$. Examples of linear basis functions of the equalizer 1200 are: $x_n$, $x_{n-1}$. Examples of nonlinear basis functions of the equalizer 1200 are: 1, $$x_n^2, x_{n-1}^2, x_n^3,$$

wherein this is not limited herein. As described above, the power consumption of the NLEQ depends on the number of basis functions of the NLEQ. Generally, the NLEQ may be dimensioned so that all basis functions are required in order to guarantee TI-ADC performance for worst case input signal conditions, which typically may be given when the input signal 1101 is large. When the input signal 1101 is small, enabling all of the basis functions may result in excessive power consumption and/or latency of the equalizer 1200. Therefore, the apparatus for controlling the equalizer (according to any one of the examples described herein) may be used to reduce the power consumption and/or latency of the equalizer 1200 in a dynamic manner based on the at least one signal metric applied to the input signal 1101 and the selection of the suitable operating mode of the equalizer 1200 based on the on the determined signal metric.

Figure 6:
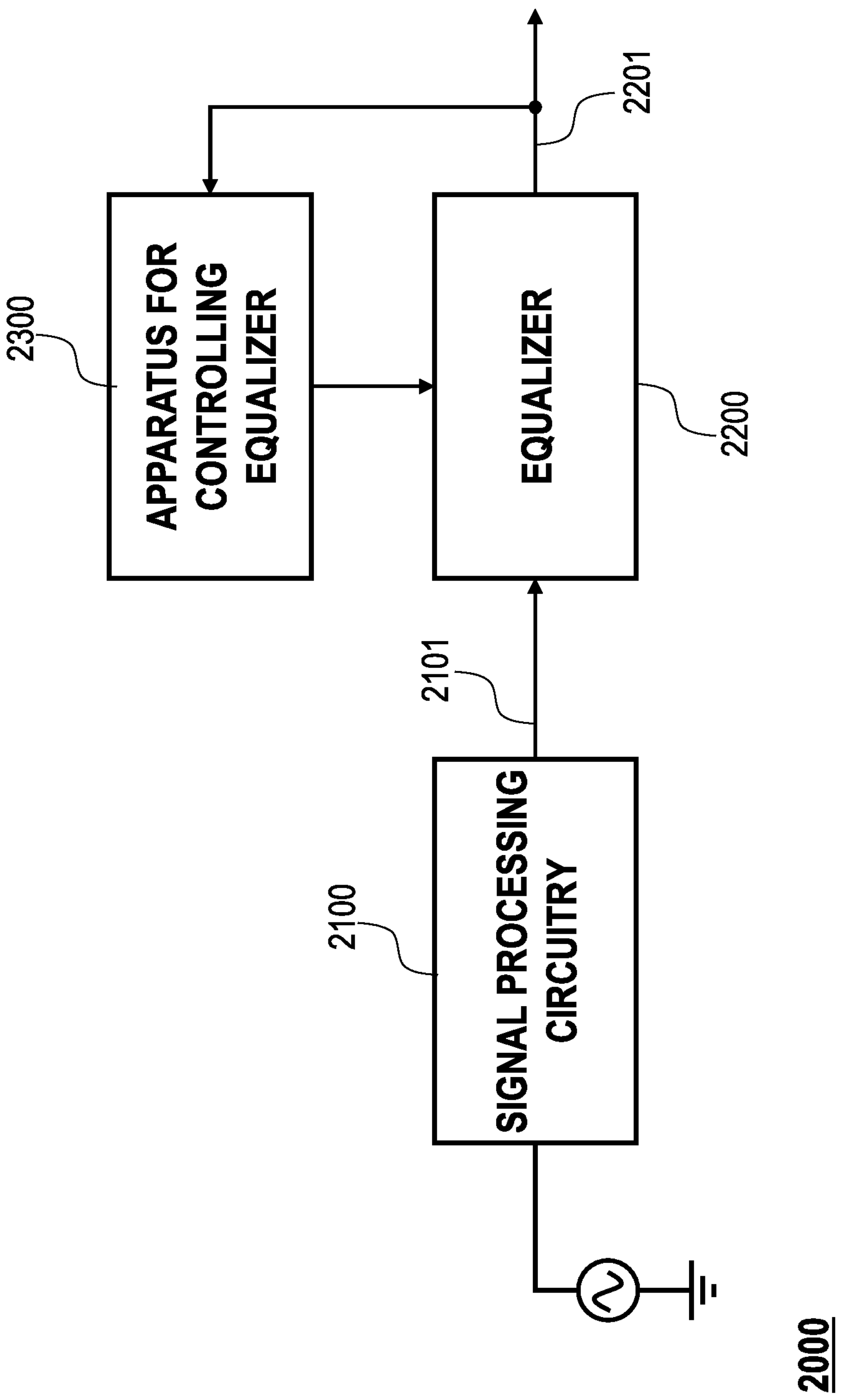
FIG. 6 illustrates a second example of a signal processing system comprising an apparatus for controlling an equalizer.

FIG. 6 schematically illustrates another exemplary signal processing system 2000. As in the foregoing example, the signal processing system 2000 comprises nonlinear signal processing circuitry 2100 and an equalizer 2200 operatively coupled to the nonlinear signal processing circuitry 2100. As described above, the equalizer 2200 is configured to equalize an input signal 2101, wherein the input signal 2101 is based on an output of the nonlinear signal processing circuitry 2100. In addition, the signal processing system 2000 comprises an apparatus 2300 for controlling the equalizer 2200, as described above.

It is noted that the signal processing system 2000 according to FIG. 6 differs from the foregoing example described with reference to FIG. 5 basically in its signal flow, since, here, an input signal 2101 of the nonlinear signal processing circuitry 2100 is first fed into the equalizer 2200, which, in turn, is configured to equalize the input signal 2101 and to generate a corresponding, equalized output signal 2201. That is, deviating from the foregoing example, in the signal processing system 2000 according to FIG. 6, the apparatus 2300 is configured to receive the output signal 2201 of the equalizer 2200 instead of directly receiving the input signal 2101 from the nonlinear signal processing circuitry 2100. However, as in the above examples, the apparatus 2200 is still configured to determine at least one signal metric based on the output signal 2201 of the equalizer 2200 and to select an operating mode of the equalizer 2200 from a plurality of different operating modes based on the determined signal metric. It is noted that the above description of the apparatus and the equalizer with reference to FIGS. 3 and 4 as well as FIG. 5 also applies to the apparatus 2300 and the equalizer 2200 according to FIG. 6, unless otherwise described herein. Accordingly, a repetition of the above description may be omitted here.

Figure 7:
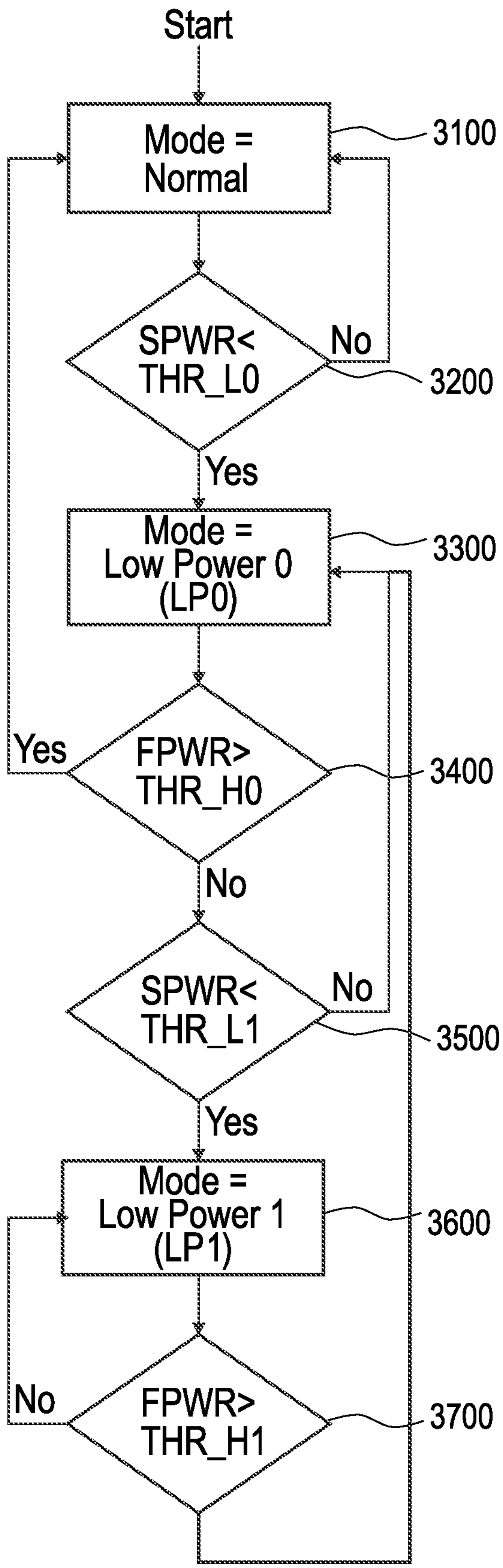
FIG. 7 illustrates a state diagram of an exemplary apparatus for controlling an equalizer.

FIG. 7 illustrates a state diagram of an exemplary apparatus for controlling an equalizer. The apparatus and the equalizer may be configured in accordance with any one of the above examples described with reference to FIGS. 1 to 6. By way of example, the state diagram may represent a finite state machine (FSM), that may be utilized by the apparatus, and particularly by its processing circuitry, for selecting an operating mode of the equalizer from a plurality of operating modes of the equalizer. Thereby, each operating mode may correspond to a respective state of the FSM.

As described above, the apparatus, and particularly its processing circuitry, may be configured to cause selection of the operating mode from the plurality of operating modes of the equalizer based on comparing at least one signal metric and/or measurement metric to at least one corresponding threshold. In the example according to FIG. 7, three exemplary operating modes are denoted as Normal (Mode), Low Power (Mode) 0 or LP0 and Low Power (Mode) 1 or LP1, which may also be referred to as first, second and third operating mode of the equalizer, as described above. Further, in this example, there may be two signal and/or measurement metrics, denoted as SPWR and FPWR, wherein SPWR represents a slow estimate of a suitable characteristic, condition, or the like, applied to an input signal or an output signal of the equalizer and FPWR represents a fast estimate of a suitable characteristic, condition, or the like, of an input signal or an output signal of the equalizer. It is noted that although FPWR and SPWR exemplarily refer to the slow and fast estimate of power or average power of the input signal or the output signal of the equalizer, the corresponding signal and/or measurement metric may refer to any estimate applied to the input signal or the output signal of the equalizer comprising one or more of an average power, an average absolute value, a peak power, a histogram count, an incidence rate of signal overload events, a reduction of average uplink Modulation and Coding format, or the like, of the input signal or the output signal of the equalizer.

According to the example of FIG. 7, there are four exemplary thresholds, denoted as THR_L0, THR_H0, THR_L1 and THR_H1, used to cause and/or control transition from one operating mode of the equalizer and/or state of its FSM to another. Thereby, by way example, threshold THR_L0 may be used to cause and/or control transition from the Normal Mode, which may be an example of the first operating mode of the equalizer as described herein, to the Low Power Mode LP0, which may be an example of the second operating mode of the equalizer as described herein. Further, thresholds THR_H0 and THR_L1 may be used to cause and/or control transition from the Low Power Mode LP0, e.g., the second operating mode, to the Low Power Mode LP1, which may be an example of the third operating mode of the equalizer as described herein. In addition, threshold THR_H0 may be used to cause and/or control transition from the Low Power Mode LP0, e.g., the second operating mode of the equalizer as described herein, back to, the Normal mode, e.g., the first operating mode of the equalizer as described herein. Furthermore, threshold THR_H1 may be used to cause and/or control transition from the Low Power Mode LP1, e.g., the third operating mode of the equalizer as described herein, back to the Low Power mode LP0, e.g., the second operating mode of the equalizer as described herein.

In FIG. 7, at operation 3100, the equalizer is operated in the Normal Mode, e.g., the first operating mode described herein. As described above, all the basis functions of the equalizer may be enabled in this Normal Mode. At operation 3200, the signal and/or measurement metric SPWR obtained based on the input signal and/or output signal of the equalizer is compared to threshold THR_L0, wherein if the signal and/or measurement metric SPWR is below threshold THR_L0 ("Yes"), transition from the Normal Mode, e.g., the first operating mode described herein, to the Low Power Mode LP0, e.g., the second operating mode described herein, is caused (operation 3300), and otherwise ("No") the normal mode, e.g., first operating mode, is maintained (operation 3100). At operation 3300, the equalizer is operated in the Low Power Mode LP0, e.g., the second operating mode described herein, in which one or more of the basis functions of the equalizer may be disabled compared to the Normal mode. At operation 3400, the signal and/or measurement metric FPWR obtained based on the input signal and/or output signal of the equalizer is compared to threshold THR_H0, wherein if the signal and/or measurement metric FPWR is above threshold THR_H0 ("Yes"), transition from the Low Power Mode LP0, e.g., the second operating mode described herein, back to the Normal Mode, e.g., the first operating mode described herein, is caused, and otherwise ("No"), at operation 3500, the signal and/or measurement metric SPWR is additionally compared to threshold THR_L1. If, at operation 3500, the signal and/or measurement metric SPWR is below threshold THR_L1 ("Yes"), transition from the Low Power Mode LP0, e.g., the second operating mode described herein, to the Low Power Mode 1, $x_n^2$, $x_{n-1}^2$, $x_n^3$, LP1, e.g., the third operating mode described herein, is caused (operation 3600). At operation 3600, the equalizer is operated in the Low Power Mode LP1, e.g., the third operating mode described herein, in which even more of the basis functions of the equalizer may be disabled compared to the Low Power Mode LP0, e.g., the second operating mode described herein. At operation 3700, the signal and/or measurement metric FPWR obtained based on the input signal and/or output signal of the equalizer is compared to threshold THR_H1, wherein if the signal and/or measurement metric FPWR is above threshold THR_H1 ("Yes"), transition from the Low Power Mode LP1, e.g., the third operating mode described herein, back to the Low Power Mode LP0, e.g., the second operating mode described herein, is caused (operation 3300), and otherwise ("No"), the Low Power Mode LP1, e.g., the third operating mode described herein, is maintained (operation 3600).

It is noted that although the example according to FIG. 7 illustrates three operating modes of the equalizer, the number of operating modes of the equalizer is not limited to this. Accordingly, the equalizer may be operable in only two different operating modes or in more than three different operating modes. Likewise, although this example illustrates four thresholds, the number of thresholds is not limited to this. Accordingly, there may be defined less or more than four thresholds. The same applies to the number of signal and/or measurement metrics, which may also differ from the two exemplary metrics of this example.

Figure 8:
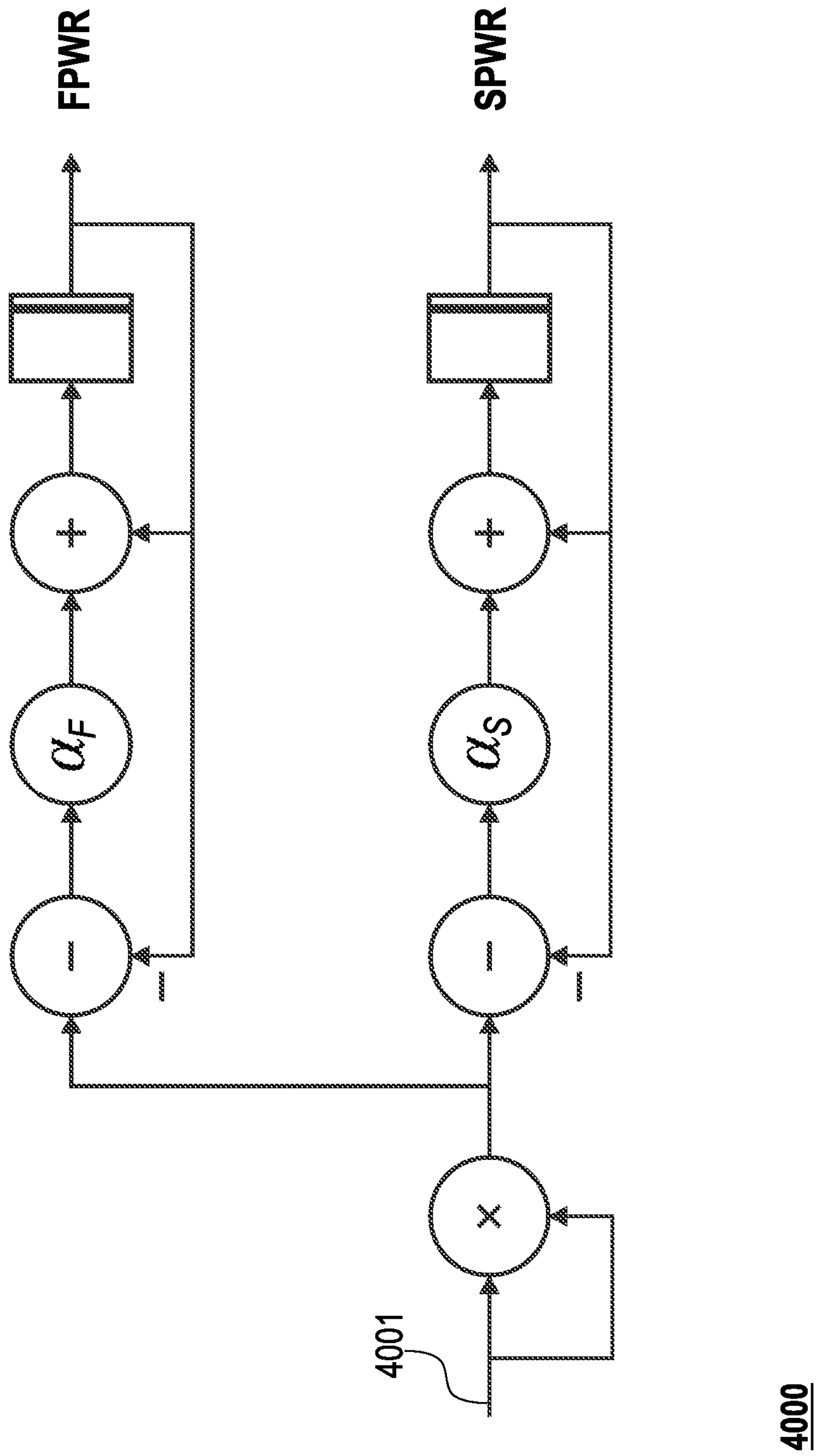
FIG. 8 illustrates an example of a signal condition and/or metric estimation.

FIG. 8 schematically illustrates an example of a signal condition and/or metric estimation, which may be used to determine at least one signal metric based on an input signal and/or an output signal of an equalizer, as described above.

As described above, the apparatus, and particularly its processing circuitry, may be configured to cause selection of the operating mode based on comparing at least one signal metric to at least one corresponding threshold. An example of the at least one threshold is given above with reference to FIG. 7, with exemplary thresholds THR_L0, THR_H0, THR_L1 and THR_H1. Further, as described above, the apparatus, and particularly its processing circuitry, may be configured to apply at least one measurement metric to the at least one of an input signal and an output signal of the equalizer to obtain the at least one signal metric. An example of the signal and/or measurement metric is given above with reference to FIG. 7, with exemplary metrics SPWR and FPWR.

In addition, as described above, the apparatus may comprise signal condition estimation circuitry configured to obtain the at least one signal metric. Thereby, the signal estimation circuitry may comprise a number of filters each of which has a different bandwidth and into which the at least one of the input signal and the output signal of the equalizer is fed, and the signal estimation circuit is configured to cause selection of the operating mode from the plurality of operating modes based on an output of the number of filters. FIG. 8 illustrates an example of such signal condition estimation circuitry 4000.

According to the example of FIG. 8, an input node of the signal condition estimation circuitry 4000 is configured to receive an input signal 4001, which may be an input signal and/or an output signal of an equalizer as described herein. The signal condition estimation circuitry 4000 is configured to square the input signal 4001 and to pass the squared input signal through a filter, which here is exemplary configured as a single pole infinite impulse response (IIR) filter. By way of example, the signal condition estimation circuitry 4000 comprises two branches, one of which is associated with the above-mentioned SPWR metric and another one of which is associated with the above-mentioned FPWR metric. As illustrated in FIG. 8, each of the SPWR and FPWR metric may form an output of the signal condition estimation circuitry 4000.

For example, the branches of the signal condition estimation circuitry 4000 may implement functions for the SPWR and FPWR metrics, which may be given according to the following mathematical expressions:

$$z_n^{(S)} = \alpha_S y_n^2 + (1 - \alpha_S) z_{n-1}^{(S)}$$

$$z_n^{(F)} = \alpha_F y_n^2 + (1 - \alpha_F) z_{n-1}^{(F)},$$

with $$z_n^{(S)}$$

denoting the slow measurement metric SPWR, $$z_n^{(F)}$$

denoting the fast measurement metric FPWR, $y_n$ denoting an output of the equalizer and constants as and af determine the respective bandwidth of the IIR filter. It is noted that the filter of the branch associated with the fast FPWR metric has a wider bandwidth than the filter of the branch associated with the slow SPWR metric.

It is noted that although FPWR and SPWR exemplarily refer to the slow and fast estimate of power or average power of the input signal or the output signal of the equalizer, the corresponding signal and/or measurement metric may refer to any estimate applied to the input signal or the output signal of the equalizer comprising one or more of an average power, an average absolute value, a peak power, a histogram count, an incidence rate of signal overload events, a reduction of average uplink Modulation and Coding format, or the like, of the input signal or the output signal of the equalizer.

Figure 9:
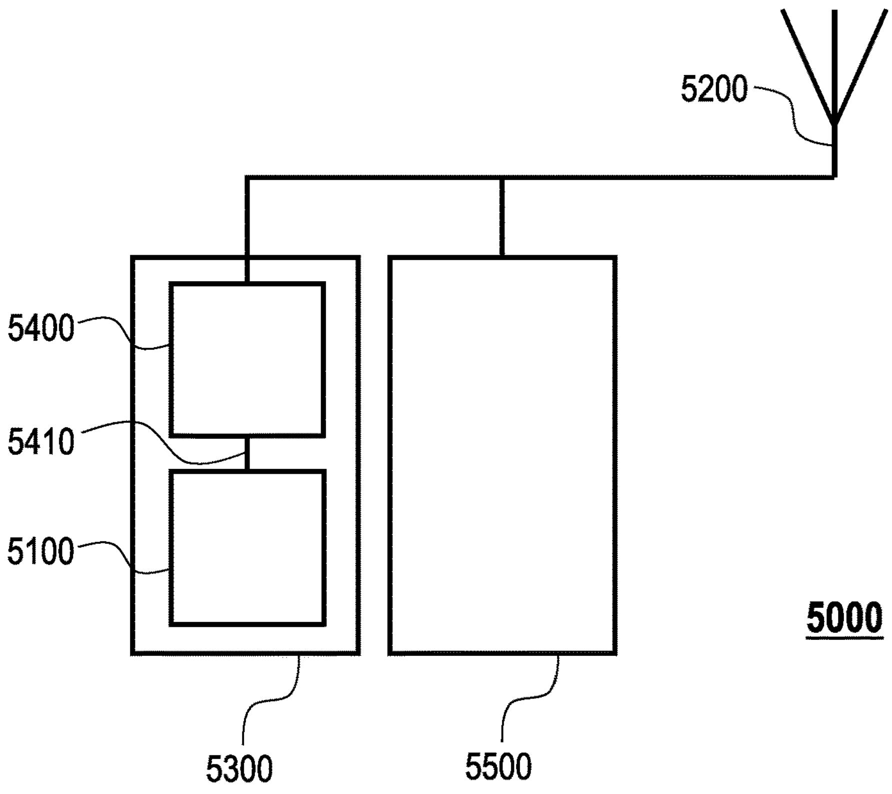
FIG. 9 illustrates an example of a base station.

An example of an implementation using analog-to-digital conversion according to one or more aspects of the architecture described above in connection with FIGS. 1 to 8 or one or more examples described above in connection with FIGS. 1 to 8 is illustrated in FIG. 9. FIG. 9 schematically illustrates an example of a radio base station 5000 (e.g., for a femtocell, a picocell, a microcell or a macrocell) comprising a signal processing system 5100 comprising an equalizer operatively coupled to the nonlinear signal processing circuitry and an apparatus for controlling the equalizer as described herein. It is noted that the apparatus is coupled to the equalizer.

The base station 5000 comprises at least one antenna element 5200. A receiver 5300 of the base station 5000 comprises the signal processing system 5100 and is coupled to the antenna element 5200. The receiver 5300 may be coupled to the antenna element 5200 via one or more intermediate elements such as one or more of a signal line, a filter, etc.

The receiver 5300 additionally comprises analog circuitry 5400, as an example of a nonlinear signal processing circuitry coupled to the signal processing system 5100. The analog circuitry 5400 is configured to supply an analog input signal 5410 to the interface circuitry or input node of the apparatus of the signal processing system 5100. The analog circuitry 5400 may comprise various elements such as one or more of a Low-Noise Amplifier (LNA), a filter, a down-converter (mixer), ElectroStatic Discharge (ESD) protection circuitry, an attenuator etc. For example, the analog circuitry 5400 may be configured to generate the analog input signal 5410 based on a RF receive signal received from the antenna element 5200 or another antenna element (not illustrated) of the base station 500.

Additionally, the base station 5000 comprises a transmitter 5500 configured to generate a RF transmit signal. The transmitter 5500 may use the antenna element 5200 or another antenna element (not illustrated) of the base station 5000 for radiating the RF transmit signal to the environment. For example, the transmitter 5500 may be coupled to the antenna element 5200 via one or more intermediate elements such as a filter, an up-converter (mixer) or a Power Amplifier (PA).

To this end, a base station with improved signal processing may be provided allowing the base station to achieve, for example, increased linearity, increased bandwidth, increase noise performance, lower power consumption and/or better scalability.

The base station 5000 may comprise further elements such as, e.g., an application processor, a baseband processor, memory, a network controller, a user interface, power management circuitry, a satellite navigation receiver, a network interface controller or power tee circuitry.

In some aspects, the application processor may include one or more Central Processing Unit (CPU) cores and one or more of cache memory, a Low-DropOut (LDO) voltage regulator, interrupt controllers, serial interfaces such as Serial Peripheral Interface (SPI), Inter-Integrated Circuit (I2C) or universal programmable serial interface module, Real Time Clock (RTC), timer-counters including interval and watchdog timers, general purpose Input-Output (IO), memory card controllers such as Secure Digital (SD)/MultiMedia Card (MMC) or similar, Universal Serial Bus (USB) interfaces, Mobile Industry Processor Interface Alliance (MIPI) interfaces and Joint Test Access Group (JTAG) test access ports.

In some aspects, the baseband processor may be implemented, for example, as a solder-down substrate including one or more integrated circuits, a single packaged integrated circuit soldered to a main circuit board or a multi-chip module containing two or more integrated circuits.

In some aspects, the memory may include one or more of volatile memory including Dynamic Random Access Memory (DRAM) and/or Synchronous Dynamic Random Access Memory (SDRAM), and Non-Volatile Memory (NVM) including high-speed electrically erasable memory (commonly referred to as Flash memory), Phase change Random Access Memory (PRAM), Magnetoresistive Random Access Memory (MRAM) and/or a three-dimensional crosspoint (3D XPoint) memory. The memory may be implemented as one or more of solder down packaged integrated circuits, socketed memory modules and plug-in memory cards.

In some aspects, the power management (integrated) circuitry may include one or more of voltage regulators, surge protectors, power alarm detection circuitry and one or more backup power sources such as a battery or capacitor.

Power alarm detection circuitry may detect one or more of brown out (under-voltage) and surge (over-voltage) conditions.

In some aspects, the power tee circuitry may provide for electrical power drawn from a network cable to provide both power supply and data connectivity to the base station using a single cable.

In some aspects, the network controller may provide connectivity to a network using a standard network interface protocol such as Ethernet. Network connectivity may be provided using a physical connection which is one of electrical (commonly referred to as copper interconnect), optical or wireless.

In some aspects, the satellite navigation receiver may include circuitry to receive and decode signals transmitted by one or more navigation satellite constellations such as the Global Positioning System (GPS), GLObalnaya NAvigatSionnaya Sputnikovaya Sistema (GLONASS), Galileo and/or BeiDou. The receiver may provide data to the application processor which may include one or more of position data or time data. The application processor may use time data to synchronize operations with other radio base stations.

In some aspects, the user interface may include one or more of physical or virtual buttons, such as a reset button, one or more indicators such as Light Emitting Diodes (LEDs) and a display screen.

Figure 10:
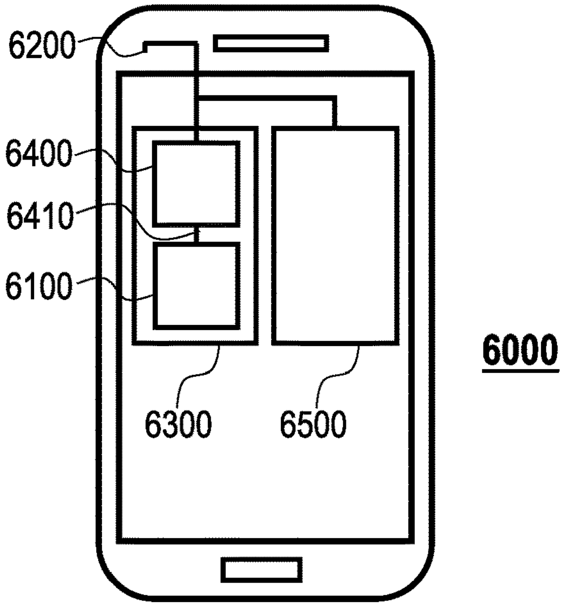
FIG. 10 illustrates an example of a mobile device.

Another example of an implementation using analog-to-digital conversion according to one or more aspects of the architecture described above in connection with FIG. 1 to or one or more examples described above in connection with FIGS. 1 to 8 is illustrated in FIG. 10. FIG. 10 schematically illustrates an example of a mobile device 6000 (e.g., mobile phone, smartphone, tablet-computer, or laptop) comprising a signal processing system 6100 comprising an equalizer operatively coupled to the nonlinear signal processing circuitry and an apparatus for controlling the equalizer as described herein. It is noted that the apparatus is coupled to the equalizer.

The mobile device 6000 comprises at least one antenna element 6200. A receiver 6300 of the mobile device 6000 comprises the signal processing system 6100 and is coupled to the antenna element 6200. The receiver 6300 may be coupled to the antenna element 6200 via one or more intermediate element such as one or more of a signal line, a filter, etc.

The receiver 6300 additionally comprises analog circuitry 6400, as an example of the nonlinear signal processing circuitry coupled to the signal processing system 6100. The analog circuitry 6400 is configured to supply an analog input signal 6410 to the interface circuitry or input node of the apparatus of the signal processing system 6100. The analog circuitry 6400 may comprise various elements such as one or more of a LNA, a filter, a down-converter (mixer), ESD protection circuitry, an attenuator etc. For example, the analog circuitry 6400 may be configured to generate the analog input signal 6400 based on a RF receive signal received from the antenna element 6400 or another antenna element (not illustrated) of the mobile device 6000.

Additionally, the mobile device 6000 comprises a transmitter 6500 configured to generate a RF transmit signal. The transmitter 6500 may use the antenna element 6200 or another antenna element (not illustrated) of the mobile device 6000 for radiating the RF transmit signal to the environment. For example, the transmitter 6500 may be coupled to the antenna element 6200 via one or more intermediate elements such as a filter, an up-converter (mixer) or a PA.

To this end, a mobile device with improved analog-to-digital conversion may be provided allowing the mobile device to achieve increased linearity, increased bandwidth, increase noise performance, lower power consumption and better scalability.

The mobile device 6000 may comprise further elements such as, e.g., an application processor, a baseband processor, memory, a connectivity module, a Near Field Communication (NFC) controller, an audio driver, a camera driver, a touch screen, a display driver, sensors, removable memory, a power management integrated circuit or a smart battery.

In some aspects, the application processor may include, for example, one or more CPU cores and one or more of cache memory, LDO regulators, interrupt controllers, serial interfaces such as SPI, I2C or universal programmable serial interface module, RTC, timer-counters including interval and watchdog timers, general purpose input-output (IO), memory card controllers such as SD/MMC or similar, USB interfaces, MIPI interfaces and JTAG test access ports.

In some aspects, the baseband processor may be implemented, for example, as a solder-down substrate including one or more integrated circuits, a single packaged integrated circuit soldered to a main circuit board, and/or a multi-chip module containing two or more integrated circuits.

The wireless communication circuits using analog-to-digital conversion according to the proposed architecture or one or more of the examples described above may be configured to operate according to one of the 3rd Generation Partnership Project (3GPP)-standardized mobile communication networks or systems. The mobile or wireless communication system may correspond to, for example, a 5th Generation New Radio (5G NR), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM), an Enhanced Data rates for GSM Evolution (EDGE) network, or a GSM/EDGE Radio Access Network (GERAN). Alternatively, the wireless communication circuits may be configured to operate according to mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Figure 11:
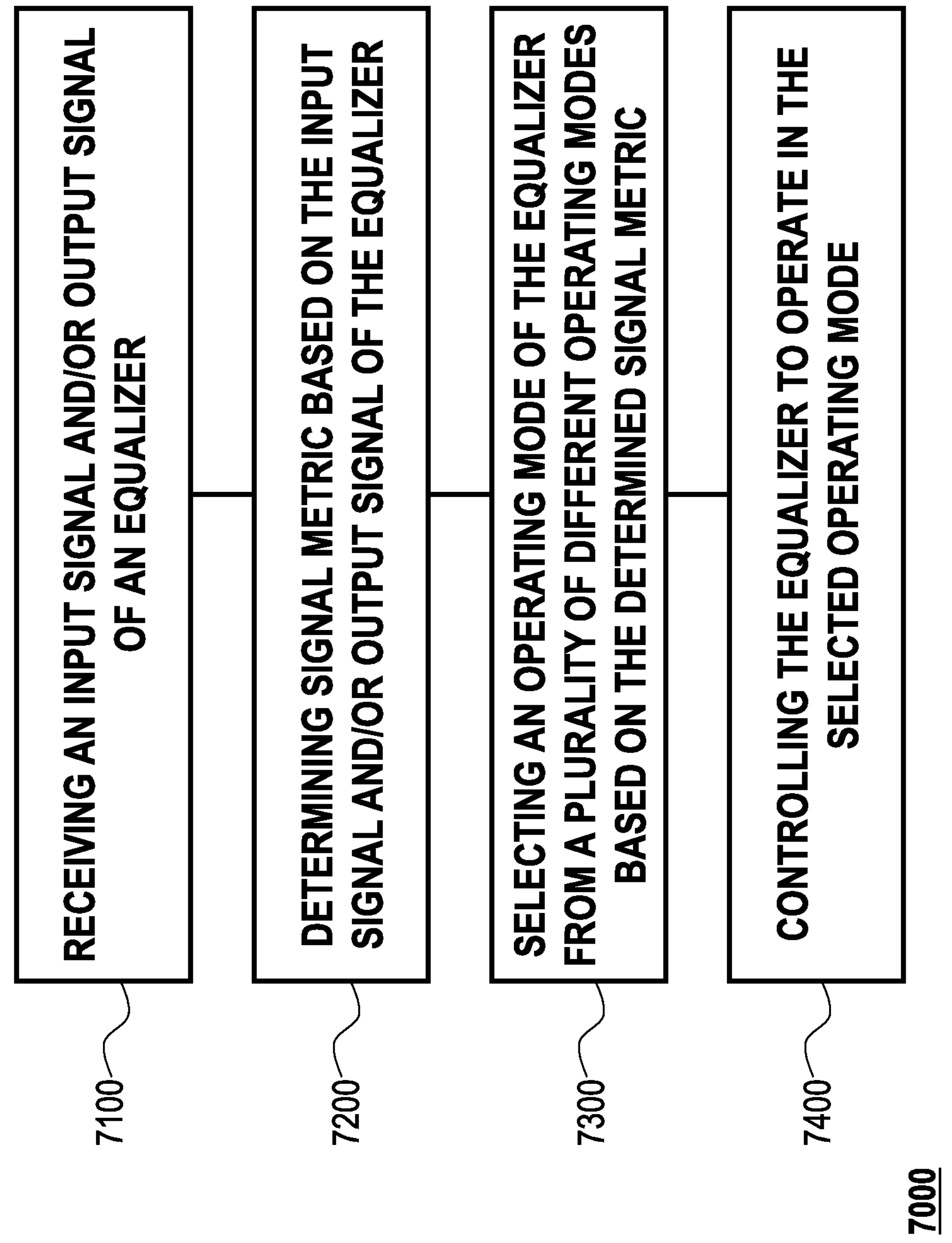
FIG. 11 illustrates in a flowchart an exemplary method for controlling an equalizer.

For further illustrating the controlling of an equalizer described above, FIG. 11 illustrates a flowchart of a method 7000 for controlling of an equalizer. The method 7000 comprises receiving 7100 at least one of an input signal and an output signal of the equalizer. Further, the method 7000 comprises determining 7200 at least one signal metric based on the at least one of the input signal and the output signal of the equalizer. In addition, the method 7000 comprises selecting 7300 an operating mode of the equalizer from a plurality of different operating modes based on the determined signal metric. The method 7000 further comprises controlling 7400 the equalizer to operate in the selected operating mode.

The method 7000 may enable improved controlling of the operation of the equalizer in terms of e.g., power consumption and/or latency of the equalizer. Further, the method may enable dynamically controlling the equalizer depending on a measurement applied to the input and/or output signal of the equalizer.

More details and aspects of the method 7000 are explained in connection with the proposed technique or one or more examples described above (e.g., FIGS. 1 to 10). The method 7000 may comprise one or more additional optional features corresponding to one or more aspects of the proposed technique or one or more examples described above.

Although the examples of FIGS. 1 to 10 are illustrated as single-ended implementations, it is to be noted that one or more components of these examples may be implemented differential as well. For example, the apparatus described herein may be integrated in the equalizer.

The examples described herein may be summarized as follows:

An example (e.g., example 1) relates to an apparatus for controlling an equalizer, the apparatus comprising interface circuitry configured to receive at least one of an input signal and an output signal of the equalizer; and processing circuitry configured to determine at least one signal metric based on the at least one of the input signal and the output signal of the equalizer, to select an operating mode of the equalizer from a plurality of different operating modes based on the determined signal metric, and to control the equalizer to operate in the selected operating mode.

Another example (e.g., example 2) relates to a previous example (e.g., example 1) or to any other example, wherein the plurality of operating modes differ from each other by at least one of basis functions enabled or disabled for equalization of the input signal by the equalizer and a power consumption of the equalizer.

Another example (e.g., example 3) relates to a previous example (e.g., example 2) or to any other example, wherein the plurality of operating modes at least comprises a first operating mode, in which a first number of basis functions of the equalizer is enabled for equalization of the input signal, and at least a second operating mode, in which a second number of basis functions of the equalizer is enabled for equalization of the input signal, and the second number of enabled basis functions is smaller than the first number of enabled basis functions.

Another example (e.g., example 4) relates to a previous example (e.g., example 3) or to any other example, wherein one or more nonlinear basis functions and/or one or more linear basis functions enabled in the first operating mode are disabled in the second operating mode.

Another example (e.g., example 5) relates to a previous example (e.g., example 4) or to any other example, wherein the second operating mode causes a lower power consumption of the equalizer than the first operating mode.

Another example (e.g., example 6) relates to a previous example (e.g., example 5) or to any other example, wherein the plurality of operating modes comprises a third operating mode in which one or more nonlinear basis functions and/or one or more linear basis functions enabled in the second operating mode are disabled.

Another example (e.g., example 7) relates to a previous example (e.g., example 6) or to any other example, wherein the third operating mode causes a lower power consumption of the equalizer than the second operating mode.

Another example (e.g., example 8) relates to a previous example (e.g., example 7) or to any other example, wherein the processing circuitry is configured to cause selection of the operating mode based on comparing the at least one signal metric to at least one corresponding threshold.

Another example (e.g., example 9) relates to a previous example (e.g., example 8) or to any other example, wherein the processing circuitry is configured to apply at least one measurement metric to the at least one of the input signal and the output signal of the equalizer to obtain the at least one signal metric.

Another example (e.g., example 10) relates to a previous example (e.g., example 9) or to any other example, wherein the at least one signal metric indicates a signal size of the input signal of the equalizer.

Another example (e.g., example 11) relates to a previous example (e.g., example 10) or to any other example, wherein the at least one measurement metric is configured for estimation of one or more of an average power, an average absolute value, a peak power, a histogram count, an incidence rate of signal overload events, a reduction of average uplink Modulation and Coding format of the at least one of an input signal and an out-put signal of the equalizer.

Another example (e.g., example 12) relates to a previous example (e.g., example 11) or to any other example, wherein the processing circuitry is configured to utilize a finite state machine, FSM, for selecting the operating mode from the plurality of operating modes, and each operating mode corresponds to a respective state of the FSM.

Another example (e.g., example 13) relates to a previous example (e.g., example 12) or to any other example, wherein the processing circuitry is configured to cause transition from one operating mode or state of the FSM to another operating mode or state of the FSM based on comparing the at least one signal metric to at least one corresponding threshold.

Another example (e.g., example 14) relates to a previous example (e.g., example 13) or to any other example, further comprising signal condition estimation circuitry configured to obtain the at least one signal metric, wherein the signal estimation circuit comprises a number of filters each of which has a different bandwidth and into which the at least one of the input signal and the output signal of the equalizer is fed, and the signal estimation circuit is configured to cause selection of the operating mode from the plurality of operating modes based on an output of the number of filters.

Another example (e.g., example 15) relates to a signal processing system, comprising nonlinear signal processing circuitry, an equalizer operatively coupled to the nonlinear signal processing circuitry, and an apparatus for controlling the equalizer according to a previous example (e.g., any one of examples 1 to 14), wherein the equalizer is configured to equalize the input signal, the input signal being based on an output of the nonlinear signal processing circuitry.

Another example (e.g., example 16) relates to a previous example (e.g., example 15) or to any other example, wherein the nonlinear signal processing circuitry is a time-interleaved analog-to-digital converter, ADC.

Another example (e.g., example 17) relates to a previous example (e.g., example 16) or to any other example, wherein the equalizer is a time-variant non-linear equalizer, NLEQ.

Another example (e.g., example 18) relates to a previous example (e.g., example 17) or to any other example, wherein the apparatus is integrated in the equalizer.

Another example (e.g., example 19) relates to a receiver, comprising a signal processing system according to a previous example (e.g., any one of examples 15 to 18) and analog circuitry coupled to the signal processing system and configured to supply an analog input signal to the nonlinear signal processing circuitry.

Another example (e.g., example 20) relates to a previous example (e.g., example 19) or to any other example, wherein the analog circuitry is configured to generate the analog input signal based on a radio frequency receive signal.

Another example (e.g., example 21) relates to a base station, comprising a receiver according to a previous example (e.g., example 19 or 20) and a transmitter configured to generate a radio frequency transmit signal.

Another example (e.g., example 22) relates to a previous example (e.g., example 21) or to any other example, further comprising at least one antenna coupled to at least one of the receiver and the transmitter.

Another example (e.g., example 23) relates to a mobile device, comprising a receiver according to a previous example, (e.g., example 19 or 20) and a transmitter configured to generate a radio frequency transmit signal.

Another example (e.g., example 24) relates to a previous example (e.g., example 23) or to any other example, further comprising at least one antenna element coupled to at least one of the receiver and the transmitter.

Another example (e.g., example 25) relates to a method for controlling an equalizer, the method comprising receiving at least one of an input signal and an output signal of the equalizer, determining at least one signal metric based on the at least one of the input signal and the output signal of the equalizer, selecting an operating mode of the equalizer from a plurality of different operating modes based on the determined signal metric, and controlling the equalizer to operate in the selected operating mode.

Another example (e.g., example 26) relates to a non-transitory machine-readable medium having stored thereon a program having a program code for performing the method according to a previous example (e.g., example 25), when the program is executed on a processor or a programmable hardware.

Another example (e.g., example 27) relates to a program having a program code for performing the method according to a previous example (e.g., example 25), when the program is executed on a processor or a programmable hardware.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for controlling an equalizer, the apparatus comprising:

interface circuitry configured to receive at least one of an input signal and an output signal of the equalizer; and processing circuitry configured to:

determine at least one signal metric based on the at least one of the input signal and the output signal of the equalizer;

select an operating mode of the equalizer from a plurality of different operating modes based on the determined signal metric, wherein each of the plurality of operating modes utilizes at least one basis function and the plurality of operating modes differ from each other by at least one basis function enabled for equalization of the input signal by the equalizer; and control the equalizer to operate in the selected operating mode.

2. The apparatus of claim 1, wherein the plurality of operating modes at least comprises a first operating mode, in which a first number of basis functions of the equalizer is enabled for equalization of the input signal, and at least a second operating mode, in which a second number of basis functions of the equalizer is enabled for equalization of the input signal, and the second number of enabled basis functions is smaller than the first number of enabled basis functions.

3. The apparatus of claim 2, wherein one or more nonlinear basis functions and/or one or more linear basis functions enabled in the first operating mode are disabled in the second operating mode.

4. The apparatus of claim 3, wherein the plurality of operating modes comprises a third operating mode in which one or more nonlinear basis functions and/or one or more linear basis functions enabled in the second operating mode are disabled.

5. The apparatus of claim 4, wherein the third operating mode causes a lower power consumption of the equalizer than the second operating mode.

6. The apparatus of claim 2, wherein the second operating mode causes a lower power consumption of the equalizer than the first operating mode.

7. The apparatus of claim 1, wherein the processing circuitry is configured to cause selection of the operating mode based on comparing the at least one signal metric to at least one corresponding threshold.

8. The apparatus of claim 1, wherein the processing circuitry is configured to apply at least one measurement metric to the at least one of the input signal and the output signal of the equalizer to obtain the at least one signal metric.

9. The apparatus of claim 1, wherein the at least one signal metric indicates a signal size of the input signal of the equalizer.

10. The apparatus of claim 9, wherein the at least one measurement metric is configured for estimation of one or more of an average power, an average absolute value, a peak power, a histogram count, an incidence rate of signal overload events, a reduction of average uplink Modulation and Coding format of the at least one of an input signal and an output signal of the equalizer.

11. The apparatus of claim 1, wherein the processing circuitry is configured to utilize a finite state machine, FSM, for selecting the operating mode from the plurality of operating modes, and each operating mode corresponds to a respective state of the FSM.

12. The apparatus of claim 11, wherein the processing circuitry is configured to cause transition from one operating mode or state of the FSM to another operating mode or state of the FSM based on comparing the at least one signal metric to at least one corresponding threshold.

13. The apparatus of claim 1, further comprising signal condition estimation circuitry configured to obtain the at least one signal metric, wherein the signal estimation circuit comprises a number of filters each of which has a different bandwidth and into which the at least one of the input signal and the output signal of the equalizer is fed, and the signal estimation circuit is configured to cause selection of the operating mode from the plurality of operating modes based on an output of the number of filters.

14. A signal processing system, comprising:

nonlinear signal processing circuitry;

an equalizer operatively coupled to the nonlinear signal processing circuitry; and an apparatus for controlling the equalizer according to claim 1, wherein the equalizer is configured to equalize the input signal, the input signal being based on an output of the nonlinear signal processing circuitry.

15. The signal processing system of claim 14, wherein the nonlinear signal processing circuitry is a time-interleaved analog-to-digital converter, ADC.

16. The signal processing system of claim 14, wherein the equalizer is a time-variant non-linear equalizer, NLEQ.

17. The signal processing system of claim 14, wherein the apparatus is integrated in the equalizer.

18. A receiver, comprising:

a signal processing system according to claim 15; and analog circuitry coupled to the signal processing system and configured to supply an analog input signal to the nonlinear signal processing circuitry.

19. The receiver of claim 18, wherein the analog circuitry is configured to generate the analog input signal based on a radio frequency receive signal.

20. A method for controlling an equalizer, the method comprising:

receiving at least one of an input signal and an output signal of the equalizer;

determining at least one signal metric based on the at least one of the input signal and the output signal of the equalizer;

selecting an operating mode of the equalizer from a plurality of different operating modes based on the determined signal metric, wherein each of the plurality of operating modes utilizes at least one basis function and the plurality of operating modes differ from each other by at least one basis function enabled for equalization of the input signal by the equalizer; and controlling the equalizer to operate in the selected operating mode.

* * * * *